June 17, 1941.  W. J. HUGHES  2,245,588
LIQUID TREATING APPARATUS AND PROCESS
Filed April 30, 1938  2 Sheets-Sheet 2
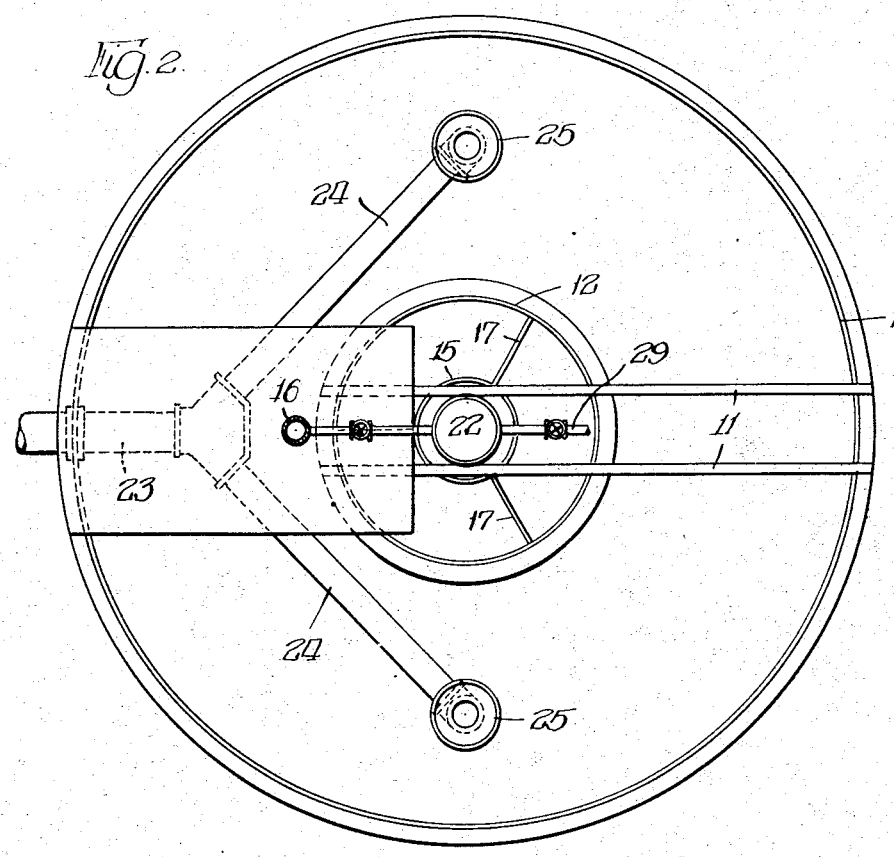
Inventor:
Walter J. Hughes,
By Cromwell, Greist & Warden
Attys Patented June 17, 1941

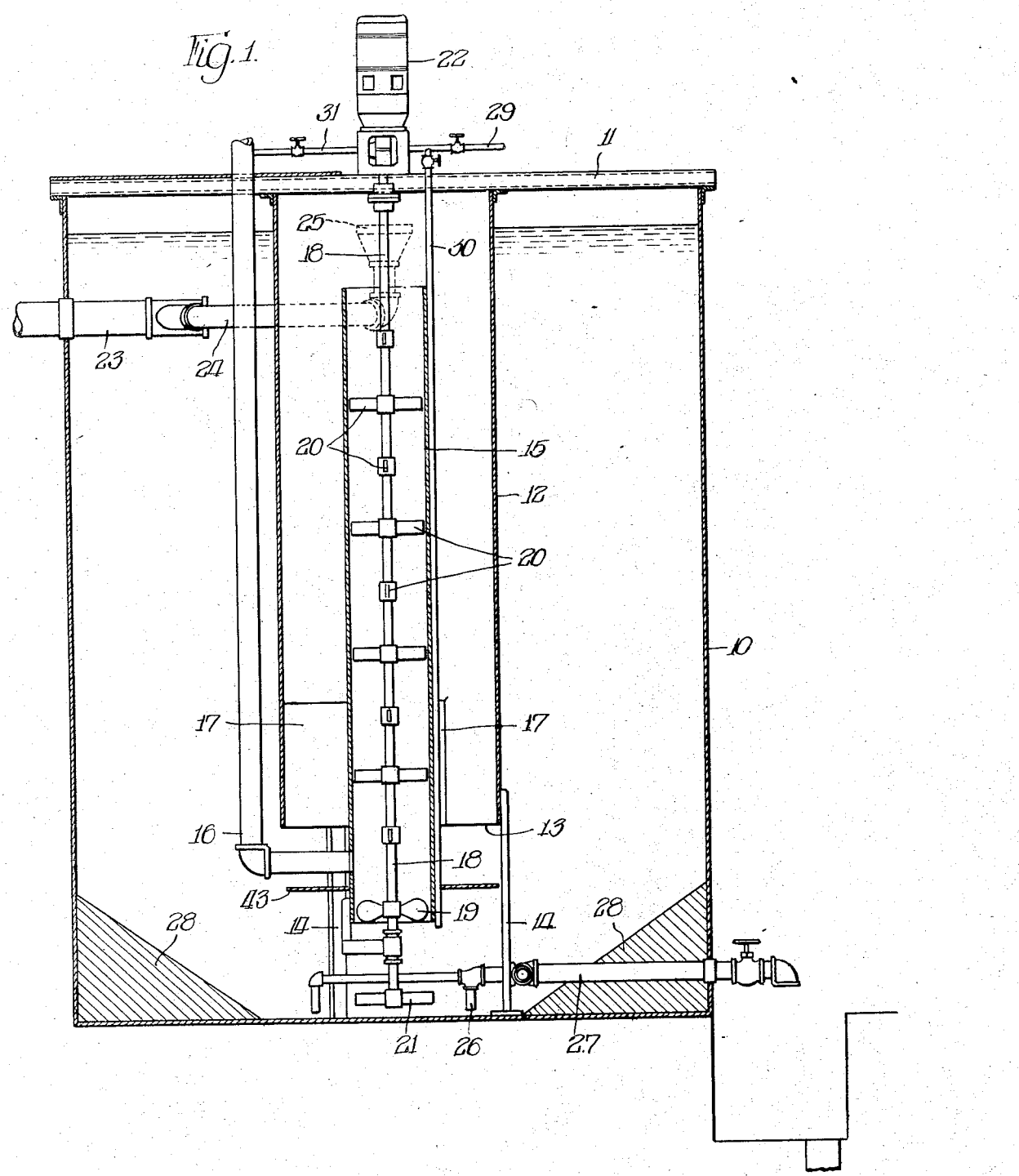

2,245,588

UNITED STATES PATENT OFFICE 2,245,588

LIQUID TREATING APPARATUS AND PROCESS

Walter J. Hughes, Chicago, Ill., assignor to International Filter Co., Chicago, Ill., a corporation of Delaware Application April 30, 1938, Serial No. 205,305

9 Claims. (Cl. 210—16)

This invention relates to the treatment of liquids to remove substances therefrom in solid form, the present application constituting a continuation in part of my copending application Serial No. 83,662, filed June 5, 1936. The treatment may involve the removal of organic or inorganic materials from various types of liquids such as water, sewage, and trade wastes, with or without the addition of reagents for aiding the process. The invention will be described with reference to an improved method and apparatus for softening, clarifying or chemically stabilizing hard water.

One of the principal objects of the invention is the provision of an improved process and apparatus for the stabilization, clarification and softening of water by a precipitation process, the formation of the precipitate being carried out so as to condition the precipitate in a particular manner to provide relatively large crystalline masses and rapid separation of the precipitate from the water.

Another and important object of the invention is to soften and clarify water by maintaining a zone of concentration of suspended particles of previously precipitated hardness-imparting constituents, continuously circulating water containing said particles through an upward turbulent rotating flow and back to said zone, effecting the softening reaction of the raw water in the presence of said particles in said upward flow, and displacing clear water from the water from said upflow.

A further object is the provision of an improved process and apparatus for stabilization, clarification and softening of water by reaction in the presence of a thick slurry or suspension of solids previously precipitated from water, the reaction conditions being controlled to produce crystalline clusters of relatively large size, which particles will rapidly deposit from the water by sedimentation if allowed to do so but which principally are maintained against sedimentation by recirculation.

Still another object of the invention is the provision of a process and apparatus by which hard water may be softened by a precipitation process and the newly formed solids removed in a more rapid manner than has been known heretofore.

An additional object is to provide a process and apparatus for softening water in the presence of a slurry comprised of suspended previously precipitated hardness-imparting constituents, in such a manner as to facilitate the formation of relatively large sized clusters of crystals from the solids precipitated out of the water, the slurry being circulated upwardly through a mixing zone in which the upward rate of rise and state of agitation are sufficiently fast and violent to maintain the slurry in suspension and to provide continuous mixing of the previously precipitated particles with the raw water from which the new particles are being formed but insufficient to prevent growth of particle size.

These and other objects will be evident upon a consideration of the following description and by reference to the accompanying drawings in which Fig. 1 is a vertical sectional view of a preferred type of apparatus constructed in accordance with the invention; and Fig. 2 is a top view of the apparatus shown in Fig. 1.

In my copending application is described a process for the softening of water wherein there is established and maintained in the lower portion of a vertical column of water a thick slurry of suspended solids previously separated from the water, portions of the slurry being continuously circulated through a mixing zone from and to the main body of slurry, and the raw water to be treated being mixed with the circulated slurry in the presence of the treating chemical to produce the softening reaction and then being passed upwardly out of the slurry to effect clarification. This process greatly reduces the time and expense involved in softening water and the present invention relates to improvements wherein even better results are obtained.

In my copending application the water containing the previously precipitated solids or slurry is circulated downwardly through a mixing zone in which the softening reaction between the raw water and chemicals is effected, the slurry and treated water from the lower portion of the mixing zone then being returned to the bottom of the main body of slurry to displace clear water from the upper portion of the latter. While this circulation is effective to produce highly satisfactory results it is possible to improve the process for certain purposes by the type of circulation which will be described herein.

In the embodiment of the apparatus shown in Figs. 1 and 2 the treating tank is indicated at 10. At the upper portion of the tank is mounted a framework 11 and to this frame is suspended a downwardly extending open-ended cylinder 12, the lower end 13 of which terminates in a plane spaced substantially above the bottom of the tank. A series of legs 14 may be used for supporting the cylinder 12, these legs resting on the bottom of the tank at their lower ends.

Within and spaced from the cylinder 12 is mounted an inner open-ended cylinder 15. The top end of cylinder 15 is positioned somewhat below the top of the outer cylinder and the bottom end is shown positioned above the bottom of the tank below the lower end 13 of the outer cylinder 12. This inner cylinder provides a mixing and reaction zone for water to be treated, the raw water entering the lower part of the inner chamber through line 16. Suitable bracing members (not shown) may be provided for supporting the inner cylinder to the outer cylinder 12. A series of vertical baffles 17 are provided adjacent the lower end of cylinder 12 to cut down the turbulence of the flow from this cylinder into the tank.

Through the inner cylinder there extends a shaft 18 which has on it an impeller 19 positioned inside the lower end of the cylinder 15. This impeller is operable upon rotation of shaft 18 to provide a turbulent upward flow of liquid through the inner mixing cylinder. The mixing action of this turbulent upward flow is augmented by the mixing paddles 20 which are mounted in spaced relation on shaft 18.

The lower end of shaft 18 extends below impeller 19 and is provided at a point adjacent the bottom of the container with an agitator 21. A main function of the agitator 21 is again to put in suspension particles which settle to the bottom of the tank during the periods of shutdown. It also assists in keeping the slurry in suspension during operation of the process.

A suitable motor with reducing gear indicated at 22 is provided at the top of the tank for driving the shaft 18 at the desired speed.

Adjacent the top of the tank there is provided an overflow 23 having branches 24 extending to suitably spaced points in the tank and terminating in the overflow receiving funnels 25. While two branches have been shown it of course will be recognized that any number of these lines may be used at least two being preferred in order to provide for a distributed draw-off of liquid treated in the apparatus. A launder or other draw-off also may be used.

The bottom of the tank 10 is provided with a series of downwardly extending pick-up lines 26 which communicate with the valve-controlled discharge line 27. The amount of slurry in the tank may be controlled by withdrawal through the line 27. Continuous withdrawal at the rate of formation is preferred.

The outer portion of the bottom of the tank may be filled in as indicated at 28 this fill providing a downwardly and inwardly sloping bottom which facilitates flow toward the center of the tank.

The water treating mechanism described is provided with a chemical feed line 30 extending downwardly adjacent the outside of the inner cylinder 15 and terminating just below the bottom of the latter.

In starting the operation of the process raw water is introduced through line 16 and chemicals are added through line 29. As the tank fills with water the impeller 19 causes a turbulent upward flow of the raw water through cylinder 15, the water overflowing from the top of this cylinder and then passing downwardly through the outer cylinder 12. Part of the water issuing from the bottom of the outer cylinder rises in the tank to be withdrawn through the drain outlets 25, but impeller 19 is run at a speed which causes the upflow through cylinder 15 to be several times greater than the flow of raw water entering through line 16 so that a major portion of the water issuing from the bottom of cylinder 12 is drawn back into the bottom of the inner cylinder and recirculated. As the raw water and chemicals pass upwardly through the chamber 15 a thorough mixture is provided, the paddles 20 assisting in effecting this result, thereby affording a substantial reacting time between the chemicals and raw water. The reaction causes precipitation of hardness-imparting constituents from the water as crystalline particles and the mixture of water and precipitated solids flows downwardly through the outer cylinder 12. Most of the water and solids emerging from the bottom of the outer cylinder 12 are drawn back into the inner cylinder by the action of the impeller 19 and recirculated in admixture with the incoming raw water. Upon recirculation of the previously treated water containing these solids the precipitate-forming reaction between the chemicals and the water being treated then occurs in the presence of previously formed crystals which results in the formation of larger crystalline particles.

The precipitate-forming reaction involved in the softening of water by the lime-soda method includes the conversion of calcium bicarbonate to calcium carbonate through the addition of lime and the conversion of calcium sulfate or other permanent hardness-imparting constituents to calcium carbonate and the corresponding sodium salt by the addition of sodium carbonate. Magnesium salts are converted into the relatively insoluble magnesium hydroxide, which is removed as a precipitate. Where these reactions are carried out as described herein the impeller 19 continually recirculates a large proportion of the water and solids descending through the outer compartment 12. There results a building up of the crystalline particles to substantial size and as these particles grow in size the concentration of solids becomes greater, thereby building up a relatively heavy slurry of crystalline particles maintained in suspension in the water which is continuously circulated to and from the mixing zone provided by the turbulent relatively rapid upward flow in cylinder 15. Apparently most of the molecules of calcium carbonate and magnesium hydroxide produced in the softening reaction deposit directly on previously formed recirculated particles. It further appears that many particles are cemented together after being formed to increase in aggregate size.

This building up of particles results in the formation of coherent cluster-like crystalline formations having a stability which resists breakdown into smaller particles under the turbulent conditions of the mixing zone. The impeller 19 and paddles 20 provide a central mixing zone in which the upflow current consisting of a major quantity of recirculated water containing previously precipitated solids and a minor quantity of water being treated is of sufficient velocity and turbulence to assure thorough mixture and maintenance in suspension of the many relatively large crystalline clusters. These operating factors result in the conditioning of the particles in such a manner as to facilitate clarification when the water containing the suspended solids passes out of the zone of agitation. That is, the crystalline particles are of such size and nature that they are not carried up by even a relatively rapid rise of water toward the outlet. Because of the state of agitation in the bottom part of the tank due to the continuous circulation, the particles remain in suspension to form a heavy slurry which is recirculated as referred to above. The nature of this slurry and the particles in it are such that apparently it tends to subside and in doing so to squeeze clear water out of the top, the clear water rising in the tank to the draw-off at the top. Fresh water is however being continuously introduced into the circulating slurry, such slurry being continuously withdrawn for circulation so that a condition of equilibrium is reached in which clear treated water emerges from the surface of the pool at the rate of input while at the same time, although a state of continuous subsidence exists, actual sedimentation with deposit on the floor of the tank does not take place. The particles are collected until a relatively large body of slurry has been collected in the lower portion of the tank, 10. The top of the slurry will be level with or above the lower end, 13, of the tube, 12. The depth of the slurry will depend upon many conditions and can be regulated by the withdrawal of solids through the pick-up lines, 26, and the tube, 27.

This process results in continual concentration of suspended solids in the slurry, which concentration is carried on to the desired point. In practice I have used concentration up to 10 per cent of solids in the slurry and higher concentration could be reached and used, but ordinarily the solids content is from about 1 per cent to about 3 per cent. To prevent undue concentration of solids these are discharged to waste either periodically or preferably continuously as referred to above. While some heavy particles brought in by the raw water or built up by crystal growth or by cementing as referred to above may deposit on the floor of the tank during operation, and be discharged from there, yet very much the greater part of the solids are held in suspension in the circulating slurry and are discharged by withdrawing some of the slurry itself.

As the solids concentration in the slurry zone is much greater than the concentration of hardness-imparting constituents in the raw water, it is possible to maintain the desired solids concentration in the slurry by the removal or blow-off of a relatively small volume of the slurry, either intermittently or continuously.

An analysis of the flow conditions in the tank will show that the process includes an initial turbulent and relatively rapid upflow in the mixing and reaction tube 15, in which a major quantity of slurry is mixed with the minor quantity of raw water during the reaction period in which the new solids are formed. Preferably, at least two or three volumes of slurry are recirculated with the one volume of water being treated and the proportion may be greater. The particular volumes will depend upon such factors as the concentration of solids in the slurry and the nature of the solids to be removed. This recirculated slurry is taken from the body of slurry in the lower portion of the tank, and this body or pool of slurry preferably is sufficiently deep to maintain the top of the slurry well above the tank bottom.

The initial relatively rapid upflow is followed by a downflow of slurry and water being treated through cylinder 12. The baffles in the lower portion of the latter have a quieting effect upon the mixture, so that the rotation and turbulence of the mixing chamber does not extend into the tank.

The relatively quiescent state of the water in the tank above the slurry zone allows for an effective escape of this upwardly rising water from the slurry and a uniform upward flow in the tank. Since the cross-sectional area of the tank is much greater than that of the mixing chamber, the upward rate of flow in the tank is relatively low. However, the conditions of the process are so effective from the standpoints of completeness of the softening reaction and retention of solids in the slurry that the size or holding time of the tank may be greatly reduced from common practice. Also since sedimentation is unnecessary for clarification, the upward rate of rise in the tank may be very much greater than that of the conventional continuous softeners used for many years heretofore.

The size of the mixing chamber with respect to length and diameter may vary widely, as may the rate of flow or holding time in it. The particular nature of the water being treated, the efficiency of the agitation, the volume of slurry recirculated and the rate of softening are factors which will be of consideration in determining upon the optimum operating conditions. A mixing time i. e., the time taken to pass the water through the mixing zone, 15, of between one-half minute and five minutes, and an average time of contact of the water being treated with the slurry between the point of initial admixture and emergence from the slurry of between one and fifteen minutes have been found acceptable.

In the softening reaction there is a period subsequent to the addition of the chemicals to the raw water in which the resulting calcium carbonate and magnesium hydroxide appear to be in a state of supersaturation in the water. The chemical reaction may be substantially complete, yet all of the precipitate will not have separated as distinct particles. The flow provided as described herein affords a substantial time of contact between the raw water, previously formed slurry and reactants. This time is augmented by the time required for the water subsequently to pass downwardly through the outer cylinder 12, the combined times required for the water and slurry to pass upwardly through the inner compartment 15 and downwardly through the outer compartment 12 being sufficient to provide contact between the slurry of previously precipitated particles and the water during the period of supersaturation. There results a substantially complete precipitation and therefore a satisfactorily softened water. The particular time desirable for the water being treated to pass through the mixing zone provided by the inner and outer cylinders will vary with different waters. For instance, a hard water high in magnesium content generally will have a longer contact time than a water low in magnesium but high in calcium. Additional contact time is provided in the slurry zone in the bottom of the tank, and where substantially more contact time is desired than is provided in the cylinders 12 and 15 a relatively large slurry zone may be employed. Even where the tank is relatively small it is desirable to use some distribution means such as the annular shelf 43 which deflects the slurry from cylinder 12 outwardly.

The slurry in cylinders 15 and 12 is heavier than the clear water rising in tank 10 and the level of liquid in cylinder 12 may be substantially the same as or slightly lower than the level of liquid in the outer tank, since the difference in densities is sufficient to establish a head insuring flow of water through the process.

The chemicals are added to the recirculated slurry from the lower end of the chemical feed line 30. The impeller causes a thorough intermixture of the chemicals with the slurry before the slurry is mixed with raw water issuing through pipe 16. This pre-mixing of the chemicals with the slurry facilitates the growth of the particles since the reactions involving the formation of precipitate necessarily occur in the presence of previously formed particles.

The pattern of circulation is of closed fountain type in that the slurry issuing from the mixing zone is distributed divergently and returned to the mixing zone periodically by a different route than the stream through the mixing zone. In the embodiment described herein the slurry from the mixing zone is distributed through 360° and the return of the slurry to the central mixing zone is from 360°. Divergent conduits likewise may be employed for distribution of the slurry through any number of directions within the 360°. Such conduits are highly desirable in installations of such size as to require them for uniform distribution of the slurry in the bottom of the tank.

The impeller by which the flow through the mixing zone is maintained acts as a stream projector, the flow from which is divergent and to which is convergent. Additionally, circulation of slurry back to the convergent flow is by a path other than the mixing zone.

An advantage of my process resides in the flexibility of the softening operation from the standpoint of quantity of water passing through the softener. I have obtained highly satisfactory results by operating the process at a raw water flow which will provide in the outer portion of the tank an upward rate or rise of 6 gallons and more per square foot per minute. It is not necessary to employ a rate of rise as high as 6 gallons per square foot per minute and in fact I have found it desirable in many cases to operate the process with a flow giving the upward rate of rise of the order of 2 gallons per square foot per minute. Thus, to obtain effective softening and clarification results at different rates with unit apparatus during different load periods it is possible to adjust the operating factors to provide the necessary output as needed.

The percentage of solids desirably maintained in the slurry will differ with different waters and operating conditions. The quantity may be of the order of 2 or 3 per cent, but this is not to be taken as limiting, as effective results may require a lower or higher percentage of solids. Where the slurry contains 3 per cent solids and about 3 volumes of slurry are recirculated per unit volume of raw water, the mixture of water being treated and slurry will contain approximately 2¼ per cent solids. The downflow of recirculated slurry projects this relatively light mixture into the relatively heavy slurry, which may assist in the clarification action.

The process has been described with particular reference to water softening and clarification. It also is applicable to the treatment of unstable waters such as oil well brines in which there is a high concentration of calcium and magnesium bicarbonates which are unstable and deposit on return lines to close them in a very short period. Both undersaturated and supersaturated waters may be stabilized by the process in much the same manner as described in my copending application. The same general type of stable crystalline clusters are formed by positive recirculation of water containing the previous precipitate upon which the new solids may form, in the case of the stabilization process as in ordinary water softening and clarification.

From the description given herein it will be recognized that many other changes may be made without departing from the scope of the invention as defined in the appended claims.

I claim:

1. Apparatus of the type described, comprising a tank, inner and outer housings extending upwardly in said tank forming mixing and circulating compartments and communicating adjacent their upper portions, one of said housings having an inlet communicating with the lower portion of said tank and said other housing having an outlet discharge into said tank above said inlet and spaced substantially below the top of said tank, means including a rotatably driven stream-projecting impeller for circulating water from the lower portion of said tank upwardly through said one housing, downwardly through said other housing, downwardly through the lower portion of said tank, and back to said one housing and for maintaining particles in the circulated water in suspension, means for adding water and a precipitation substance to said circulating liquid, means for withdrawing clarified water from said tank at a point spaced substantially above the outlet for said other housing, and a waste outlet from said tank substantially below said clarified water withdrawal means.

2. Apparatus of the construction described in claim 1, including, in addition to said rotatably driven stream-projecting impeller, an agitator for assisting in maintaining particles in the lower portion of said tank in suspension.

3. Apparatus of the type described, comprising a tank, an inner upwardly extending casing having an inlet adjacent the lower portion of said tank and an outlet substantially above said inlet, an outer upwardly extending casing surrounding said inner casing in spaced relation therewith, the upper portion of said outer casing extending above the outlet of said inner casing, and the lower portion of said outer casing having a discharge outlet into said tank above the inlet of said inner casing, means including a rotatably driven stream-projecting impeller for circulating water from the lower portion of said tank convergently to and upwardly through said inner casing, downwardly through and divergently from said outer casing into said tank, and back to said inner casing, and for maintaining particles in the circulated water in suspension, means for adding water and a particle-forming substance to the circulating water, means for withdrawing clarified water from said tank at a point spaced substantially above the outlet for said outer casing, and waste outlet means for said tank substantially below said clarified water withdrawing means.

4. Apparatus for treating water, comprising a tank, an inner casing having an inlet adjacent the lower portion of said tank and an outlet substantially thereabove, an outer casing surrounding said inner casing in spaced relation therewith, the upper portion of said outer casing extending above the outlet of said inner casing and above the normal liquid level in said tank and the lower portion of said outer casing having an outlet discharge into said tank above the inlet for said inner casing, baffle means within said outer casing for decreasing liquid rotation therein, additional baffle means below the outlet for said outer casing for directing water outwardly into said tank above said inlet for the inner casing, means including a rotatably driven stream-projecting impeller for circulating water from the lower portion of said tank convergently to and upwardly through said inner casing, downwardly through and divergently from said outer casing into said tank, and back to said inner casing, and for maintaining the particles in the circulated water in suspension, means for adding water and a precipitation substance to the circulated water, means for withdrawing clarified water from said tank at a point spaced substantially above the outlet for said outer casing, and a waste outlet for said tank substantially below said clarified water withdrawal means.

5. Apparatus for treating water, comprising a tank, a first casing extending upwardly in said tank and having an inlet adjacent a lower portion of the tank and an outlet substantially above said inlet; a rotatably driven stream-projecting impeller for circulating water from the lower portion of said tank through said inlet, through said casing in a turbulent flow, and out of said outlet; a second upwardly extending casing in said tank having its upper portion in communication with the outlet of said first casing and also having an outlet positioned for returning the circulated water from said first casing back to the lower portion of said tank at a point above the inlet of said first casing; an agitator positioned in the lower portion of said tank to assist said impeller in maintaining particles in said circulated water in suspension; a treated water drawoff in the upper portion of said tank; means for adding incoming water and a reagent to the circulated water passing through said first named casing; and a waste drawoff for said tank located substantially below said treated water drawoff.

6. Apparatus for treating water, comprising a tank, inner and outer housings extending upwardly in said tank forming mixing and circulating compartments and communicating adjacent their upper portions, one of said housings having an inlet communicating with the lower portion of said tank and said other housing having an outlet discharge into said tank above said inlet and spaced substantially below the top of said tank, means including a rotatably driven stream-projecting impeller for circulating water from the lower portion of said tank upwardly through said one housing, downwardly through said other housing and outwardly into said tank and for maintaining particles in the circulated water in suspension, means for adding a precipitation reagent to the circulated water on the intake side of said impeller, means for adding incoming water on the discharge side of said impeller, means for withdrawing treated and clarified water from the upper portion of said tank, and a waste outlet for said tank substantially below said clarified water withdrawal means.

7. In the process for removing substances from water by the formation of a precipitate and clarification of the water from said precipitate, the steps which comprise maintaining a body of water; maintaining in the lower portion of said body of water a body of slurry composed of water containing suspended particles separated and collected from a relatively large body of previously treated water; circulating a portion of said slurry convergently to and upwardly through a turbulent mixing zone at least partly separated from said body of water but communicating with said body of slurry, then downwardly from and divergently outwardly to said body of slurry at a point above the lower portion of said upward flow of said slurry; applying substantial mechanical propelling energy to said slurry in addition to any energy imparted thereto by the incoming water to produce turbulence in said mixing zone, to effect said circulation of slurry and to maintain the particles in the circulated slurry in suspension; passing incoming water and precipitation compounds upwardly through said turbulent mixing zone with said slurry; forming solids from said precipitation compounds in said water while passing through said mixing zone; removing slurry particles to control the amount of said slurry; displacing clarified water out of said slurry, and withdrawing said displaced clarified water from above said body of slurry.

8. In the softening of water, the steps which include establishing in the lower portion of a body of water a zone containing a slurry of suspended particles precipitated from previously treated water; applying substantial mechanical propelling and agitating energy to said slurry, whereby slurry from different parts of said zone is passed convergently to and upwardly through a turbulent mixing zone at least partly separated from said body of water, then downwardly and divergently outwardly into said slurry zone at a point above the lower portion of the upward flow of said mixing zone; passing incoming water and a precipitation compound upwardly through said mixing zone with said slurry; dividing said divergent outward flow into a major downward flow and a minor upward flow in said slurry zone corresponding to the throughput of incoming water, returning slurry from said major flow to said mixing zone, displacing said minor flow upwardly out of said zone of slurry, withdrawing clarified water from a point spaced above said body of slurry, and withdrawing slurry particles to control the volume of said zone of slurry.

9. In the process for removing substances from water by the formation of a precipitate and clarification of the water from said precipitate, the steps which comprise maintaining a body of water; maintaining in the lower portion of said body of water a body of slurry composed of water containing at least one per cent of suspended particles collected from a relatively large volume of previously treated water; passing the incoming water and added precipitation compounds upwardly through a turbulent mixing zone at least partly separated from said body of water but communicating with said body of slurry; forming solids from said precipitation compounds while passing through said mixing zone; circulating slurry from a lower portion of said body of slurry convergently to and upwardly through said mixing zone with said incoming water, and divergently outwardly into said body of slurry above the lower portion of said upward flow; applying substantial mechanical propelling energy to said slurry in addition to any energy imparted thereto by the incoming water to produce turbulence in said mixing zone, to effect said circulation of slurry, and to maintain the particles in the circulated slurry in suspension; dividing the divergent flow into a major downward flow in said body of slurry and a minor upward flow corresponding to the throughput of incoming water returning slurry from said major flow downwardly to said mixing zone to complete said circulation; displacing said minor flow upwardly out of said zone of slurry as clarified water; withdrawing clarified water from a point spaced above said body of slurry; and withdrawing slurry particles to control the volume of said body of slurry.

WALTER J. HUGHES.